US006204782B1

(12) United States Patent
Gonzalez et al.

(10) Patent No.: US 6,204,782 B1
(45) Date of Patent: Mar. 20, 2001

(54) UNICODE CONVERSION INTO MULTIPLE ENCODINGS

(75) Inventors: Julio Amable Gonzalez, San Jose, CA (US); Peter K. Edberg, Eugene, OR (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/161,322

(22) Filed: Sep. 25, 1998

(51) Int. Cl.$^7$ .................................................. H03M 7/00

(52) U.S. Cl. ................................................ 341/90

(58) Field of Search ........................ 341/90, 106; 345/467

(56) References Cited

U.S. PATENT DOCUMENTS

| | | | |
|---|---|---|---|
| 5,091,950 | 2/1992 | Ahmed | 381/51 |
| 5,170,445 | 12/1992 | Nelson et al. | 382/56 |
| 5,309,358 | 5/1994 | Andrews et al. | 395/775 |
| 5,477,451 | 12/1995 | Brown et al. | 364/419.08 |
| 5,682,158 | * 10/1997 | Edberg et al. | 341/90 |
| 5,784,069 | * 7/1998 | Daniels et al. | 345/467 |
| 5,784,071 | * 7/1998 | Tang et al. | 345/467 |
| 5,793,381 | * 8/1998 | Edberg et al. | 345/467 |

OTHER PUBLICATIONS

Becker, Joseph D., "Multilingual Word Processing", vol. 251, Issue #1, Scientific American, Jul. 1984, USA.
Davis M. et al. "Unicode", Proceedings of the International Conference on Systems, Man and Cybernetics, Nov. 4–7, 1990, pp. 499–504.
Apple Computer, Inc., "Inside Macintosh, vol. VI", pp. 1–21 to 1–22 (World Development) Jun. 1991.
Unicode Consortium "The Unicode Standard", Version 1.0, vol. 1, Oct. 1991.
IBM Technical Disclosure Bulletin, "Technique to Provide NLS Code Page Conversion with Roundtrip Fidelity", vol. 35, No. 5, Oct. 1992, p. 273.
IBM Technical Disclosure Bulletin, "Validation of Double–Byte Character Sets Text for Prompting in a Language–Sensitive Editing System", vol. 37, No. 11, Nov. 1994, pp. 11–14.
Trans–European Research and Education Networking Association (TERENA). "Alpha Test Release of the C3 System for Coded Character Set Conversion". Dec. 15, 1994, pp. 1–3.
Terena, "Introduction to the C3 System for Conversion of Coded Character Sets", Dec. 15, 1994, pp. 1–10.
Bauwens et al., "Standardization as a Prerequisite for Accessibility of Electronic Text Information for Person's Who Cannot Use Printed Material", Transactions on Rehabilitation Engineering, IEEE, vol. 3, Iss. 1, Mar. 1995, pp. 84–89.
Peter Edberg, "Background Information–mapping tables for the Mac™ OS", Apr. 15, 1995, (Internet posting at Ftp:// Unicode.org/pub/Mapping_Tables/Apple).
Davis, M. et al., "International Support in Applications and Systems Software: Part Two", vol. 2, No. 4, Jul. 1995, pp. 14, 16–17, 22–24.

(List continued on next page.)

*Primary Examiner*—Trong Phan
(74) *Attorney, Agent, or Firm*—Beyer Weaver &Thomas, LLP

(57) ABSTRACT

Techniques to converting source text (e.g., Unicode text) to multiple different encodings are disclosed. The disclosed techniques operate without any font or style information that could suggest the original encoding types. For a given source text, the techniques intelligently determine which of a variety of available target encodings are most appropriate. The determination of the most appropriate target encodings is flexible enough to accommodate different criteria or tolerance levels in performing the conversion as may be desired. The conversion out of Unicode into multiple different encodings also requires the determination of where and when to switch between the available target encodings. Also disclosed is a technique to automatically identify those target encoding that are available.

31 Claims, 11 Drawing Sheets

OTHER PUBLICATIONS

Nadine Kano, "Yes, Virginia, Windows 95 Does Do Unicode!", Creating Unicode Apps for Windows 95, Microsoft Developer Network News, Jul./Aug. 1995.

Frank Yung–Fong Tang, "A1: Implementing Unicode in Netscape Navigator", Ninth International Unicode Conference, San Jose, CA, Sep. 4–6, 1996, pp. 1–26.

* cited by examiner

UNICODE CONVERSION INTO MULTIPLE ENCODINGS

CROSS-REFERENCE TO RELATED APPLICATION

This application is related to U.S. Pat. Nos. 5,682,158; 5,784,069; 5,784,071; and 5,793,381, the contents of which are incorporated herein by reference for all purposes.

BACKGROUND OF THE INVENTION

1. Field of the Invention

The present invention relates to a system for converting between character codes for printed or displayed text and, more particularly, to a code converter for converting one character set to multiple character sets.

2. Description of the Related Art

Computers and other electronic devices typically use text to interact with users. The text is usually displayed on a monitor or some other type of display device. Because the text must be represented in digital form inside the computer or other electronic device, a character set encoding must be used. Generally speaking, a character set encoding operates to encode each character of the character set with a unique digital representation. The characters (which are encoded) correspond to letters, numbers and various text symbols and are assigned numeric codes for use by computers or other electronic devices. The most popular character set for use with computers and other electronic devices is the American Standard Code for Information Exchange (ASCII). ASCII uses 7-bit sequences for its encodings. In other countries, different character sets are used. In Europe, the dominant character encoding standards are the ISO 8859-X family, especially ISO 8859-1 (called "Latin-1") developed by the International Standards Organization (ISO). In Japan, the dominant character encoding standard is JIS X0208 where JIS refers to the Japanese Information Standard and was developed by Japan Standards Association USA). Examples of other existing character sets include Mac™ OS Standard Roman encoding (by Apple Computer, Inc.), Shift-JIS (Japan), Big5 (Taiwan), and many more.

With the ongoing globalization of business and networks, it has become important for computers or other electronic devices to be able to handle multiple character encodings. For example, the same computer or electronic device may be used by persons of different nationalities who wish to interact with the computer or other electronic device in a different language. For each such language a different character set encoding is usually needed. However, character sets for the same language can also differ.

There is also a need to be able to convert from one character set encoding to another encoding. For example, a user in France using ISO 8859-1 may want to send an electronic mail message in French to a user in Israel who is using ISO 8859-8. Because the sender and receiver are using different character set encodings, the non-ASCII characters in the message will be garbled for the user in Israel. Ideally, one of the computers or electronic devices would convert from one character set to another character set. This has been achieved to a limited extent between a few character sets, but is largely not possible with modern computers or electronic devices. Code conversion is made difficult because of the numerous different character standards and the often conflicting or inconsistent national standards.

The Unicode™ standard (hereafter simply Unicode or Unicode standard) was developed to provide an international character encoding standard. The designers of the Unicode standard wanted and did provide a more efficient and flexible method of character identification. The Unicode standard includes characters of all major International Standards approved and published before Dec. 31, 1990, as well as other characters not in previous standards. The characters are encoded in the Unicode standard without duplication. The codes within the Unicode standard are 16-bits (or 2 bytes) wide.

A character code standard such as the Unicode standard facilitates code conversion and enables the implementation of useful processes operating on textual data. For example, in accordance with the above example, the computer or other electronic device in France can transmit Unicode characters and the computer or other electronic device in Israel can convert the Unicode characters it receives into a Hebrew based character set that is compatible with the computer or other electronic device in Israel. For additional detail about the Unicode standard, see, e.g., The Unicode Standard, Worldwide Character Encoding, Version 2.0, Addision-Wesley 1996, which is hereby incorporated by reference in its entirety.

One problem with Unicode is that when the Unicode text originates from multiple different encodings, it is difficult to convert the Unicode text back to the original multiple different encodings. In particular, some computer systems or applications that execute on computer systems do not support Unicode encodings. Hence, when such computer systems or applications receive Unicode text, they are not able to properly utilize the text. Hence, code conversion of the Unicode text to a target encoding understood by the computer system or application is needed. The difficulty is when the Unicode originates from multiple different encodings, the computer system (e.g., operating system) would not normally understand how to convert the Unicode back to the original multiple different encodings. In some cases, font or style information might be available and associated with the Unicode text so as to provide a suggestion as to the originating encodings. However, often such font or style information is not available.

Thus, there is a need for improved approaches to converting Unicode text to multiple different encodings.

SUMMARY OF THE INVENTION

Broadly speaking, the invention relates to techniques for converting source text (e.g., Unicode text) to multiple different encodings. The invention operates without any font or style information that would suggest the original encoding types. The invention is able to intelligently determine which of a variety of available target encodings are most appropriate for the given source text. The determination of the most appropriate target encodings can be flexible enough to accommodate different criteria or tolerance levels in performing its conversion. The criteria can, for example, be determined according to the intended use for the converted text, namely printing or displaying of the converted text. The various tolerance level can, for example, include strict, loose or fallbacks. Another aspect of the invention pertains to the automatic identification of those target encoding that are available.

The invention can be implemented in numerous ways, including as a system, an apparatus, a method, or computer readable medium. Several embodiments of the invention are summarized below.

As a code conversion system for converting a source string to a target string, an embodiment of the invention includes: a target encoding list containing available target encodings for the code conversion system; and a multi-encoding code converter that receives the source string and converts the source string into the target string, the target string including a plurality of encoding runs of different ones of the available target encodings.

As a computer-implemented method for converting a source encoding to target encodings selected from available target encodings, an embodiment of the invention includes the acts of: receiving a source text block, the source text block including a series of text elements; selecting one of the available target encodings; selecting one of the text elements from the source text block; determining whether the selected text element can be converted into the selected target encoding; selecting a next one of the text elements from the source text block and repeating the determining when the selected text element can be converted into the selected target encoding; and selecting another one of the available target encodings and repeating the determining for the selected text element when the selected text element cannot be converted into the selected target encoding.

As a computer-implemented method for producing a target encoding list for use by a code conversion system in converting characters in a source encoding to at least one target encoding, the target encoding list and the code conversion system being associated with a computer system, an embodiment of the invention includes the acts of: retrieving scripts that are installed on the computer system; retrieving fonts that are installed on the computer system; determining a portion of the retrieved fonts to be added to the target encoding list; and producing the target encoding list from the retrieved scripts and the portion of the retrieved fonts.

As a computer readable medium including computer program code for converting a source encoding to target encodings selected from available target encodings, an embodiment of the invention includes: first computer readable medium configured to receive a source text block, the source text block including a series of characters; second computer readable medium configured to select one of the available target encodings; third computer readable medium configured to select one of the characters from the source text block; fourth computer readable medium configured to determine whether the selected character can be converted into the selected target encoding; and fifth computer readable medium configured to select another one of the available target encodings and then to repeat the fourth computer readable medium using the newly selected target encoding when the fourth computer readable medium determines that the selected text element cannot be converted into the selected target encoding.

As a computer readable medium including computer program code for producing a target encoding list for use by a code conversion system in converting characters in a source encoding to at least one target encoding, the target encoding list and the code conversion system being associated with a computer system, an embodiment of the invention includes: computer readable medium configured to retrieve scripts that are installed on the computer system; computer readable medium configured to retrieve fonts that are installed on the computer system; computer readable medium configured to determine a portion of the retrieved fonts to be added to the target encoding list; and computer readable medium configured to produce the target encoding list from the retrieved scripts and the portion of the retrieved fonts.

The invention has various advantages depending on the aspects of the invention being implemented. One advantage of the invention is that it converts Unicode text to multiple target encodings so that a high quality code conversion is achieved. Another advantage of the invention is that it is not dependent on having any font or style information that would assist in the code conversion. Still another advantage of the invention is that it is efficient and controllable such that various criteria and tolerances can affect the code conversion. Another advantage of the invention is that the invention can also choose appropriate target encodings for failback mappings. Yet another advantage of the invention is the ability to identify available target encodings on a computer system in an automated fashion.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
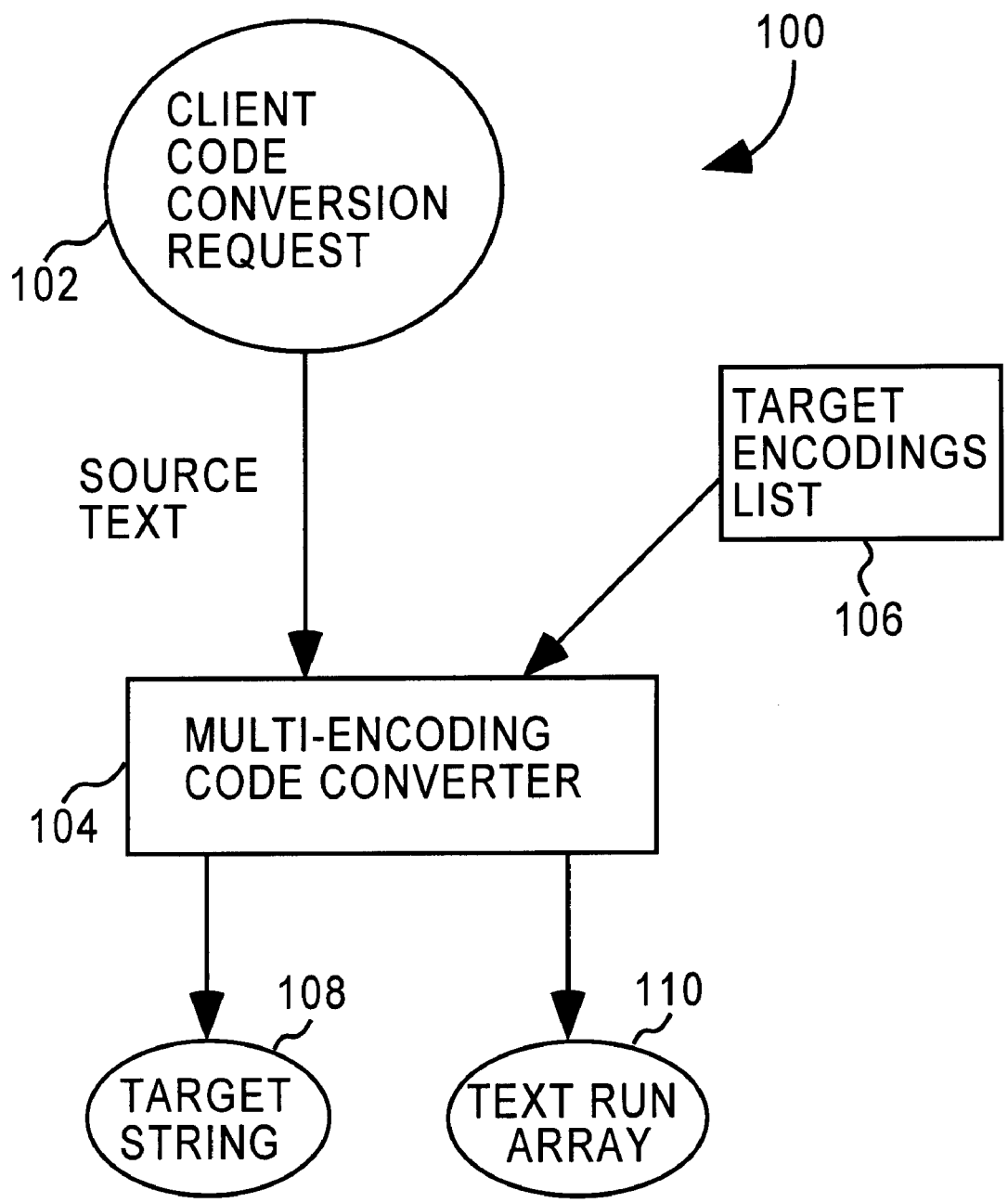
FIG. 1 is a code conversion system according to an embodiment of the invention.

The invention relates to techniques for converting source text (e.g., Unicode text) to multiple different encodings. The invention operates without any font or style information that could suggest the original encoding types. The invention is able to intelligently determine which of a variety of available target encodings are most appropriate for the given source text. The determination of the most appropriate target encodings is flexible enough to accommodate different criteria or tolerance levels in performing the conversion as may be desired. The criteria can, for example, be determined according to the intended use for the converted text, namely printing or displaying of the converted text. The various tolerance levels can, for example, include strict, loose or fallback. The conversion out of Unicode into multiple different encodings also requires the determination of where and when to switch between the available target encodings. The invention can use a variety of different approaches in deciding where and when to switch encodings as well as what encoding to switch to.

Another aspect of the invention pertains to the automatic identification of those target encodings that are available. The identified available target encodings are provided to a code conversion system so that the source text can be converted to one or more different encodings that are known to be available to the system.

The Unicode standard is a compilation of characters from other character encodings developed into a single, universal, international character encoding standard. The format of the Unicode character encodings are 16 bits wide. Within this document, Unicode characters are represented in hexadecimal with a preceding u (e.g., u0041), and characters in other encodings are represented in hexadecimal with a preceding x (e.g., x41 for a 1-byte character, x8140 for a 2-byte character).

For ease of reference, the following definitions are useful in understanding code conversion:

1. Code Point: A code point is a bit pattern in a particular encoding. Usually the bit pattern is one or more bytes long. A Unicode code point is always 16 bits or two bytes.

2. Encoding: An encoding is a one-to-one mapping between a set of characters and a set of code points. For example, the ASCII encoding maps a set including a–z, A–Z, and 0–9 to the code points x00 through x7F.

3. Text Element: A text element is a sequence of one or more characters that are treated as a unit for a particular operation. For example, LATIN CAPITAL LETTER U followed by NON-SPACING DIAERESIS is a text element (e.g., two adjacent characters in this example) for the code conversion operation in accordance with the invention.

4. Fallback: A fallback is a sequence of one or more characters in the target encoding that are not exactly equivalent to the source characters but which preserve some of the information of the original. For example, (C) is a possible fallback for ©.

5. Default: A default is a sequence of one or more characters in the target encoding that are used when nothing in the target encoding even resembles the source code points.

The general conversion technique according to the invention converts source characters to target characters of different multiple target encodings because the source characters are not all convertible into a single target encoding. Preferably, the source characters are Unicode characters. In the discussion provided below, it is assumed that the source characters are Unicode characters. However, the invention is not limited to conversion of only Unicode characters.

Embodiments of the invention are discussed below with reference to FIGS. 1–10. However, those skilled in the art will readily appreciate that the detailed description given herein with respect to these figures is for explanatory purposes as the invention extends beyond these limited embodiments.

FIG. 1 is a code conversion system 100 according to an embodiment of the invention. The code conversion system 100 operates to convert text from a Unicode encoding to multiple target encodings.

The code conversion system 100 begins with a client code conversion request 102. A client application typically calls the code conversion system 100 requesting a code conversion of a source text string. The client code conversion request 102 includes at least the source text string which contains of a plurality of characters. The source text string is supplied to a multi-encoding code converter 104. The multi-encoding code converter 104 operates to process the source text string to identify which portions of the source text string are to be converted to what particular target encodings. The multi-encoding code converter 104 receives a list of available target encodings from a target encoding list 106. Typically, the target encodings contained within the target encoding list 106 are ordered in accordance with predetermined preferences. For example, the predetermined preferences could be listed in the target encoding list 106 with the most preferred target encoding being first in the list.

The multi-encoding code converter 104 converts the source text string into a target string 108 using the target encoding list 106. The target string 108 includes characters in multiple different encodings. The multi-encoding code converter 104 also produces a text run array 110. The text run array 110 indicates the particular target encoding used for particular characters in the target string 108. In one embodiment, the text run array 110 provides a target encoding for sequential runs of text within the target string 108. In any event, the resulting output target string from the multi-encoding code converter contains characters that are encoded in multiple different target encodings.

The code conversion system 100 is particularly suited for use on a computer system. For example, when an application program executing on a computer system does not support Unicode, an incoming Unicode text to the application cannot be properly displayed or printed by the application program. In such case, the Unicode text needs to be converted out of Unicode into some other target encodings that the application and the computer system do understand. However, given that Unicode includes codes for many of the worlds various character sets (encodings), often a single target encoding is not able to be utilized for all of the Unicode text. Therefore, according to the invention, the code conversion system 100 is able to convert the Unicode text into multiple target encodings in an intelligent and efficient manner.

The multi-encoding code converter 104 operates to determine which of the available target encodings for a computer system are to be used in the conversion of the source string into the target string which ends up having multiple target encodings. The multi-encoding code converter 104 can perform such operations in a variety of approaches. A first approach permits conversion from Unicode text to multiple runs of text with different target encodings with a bias toward a preferred target encoding. A second approach permits conversion from Unicode text to multiple runs of text with different target encodings while attempting to minimize switching between target encodings. The first and second approaches are representative of the variety of multi-encoding approaches that the multi-encoding converter 104 can utilize.

Figure 6:
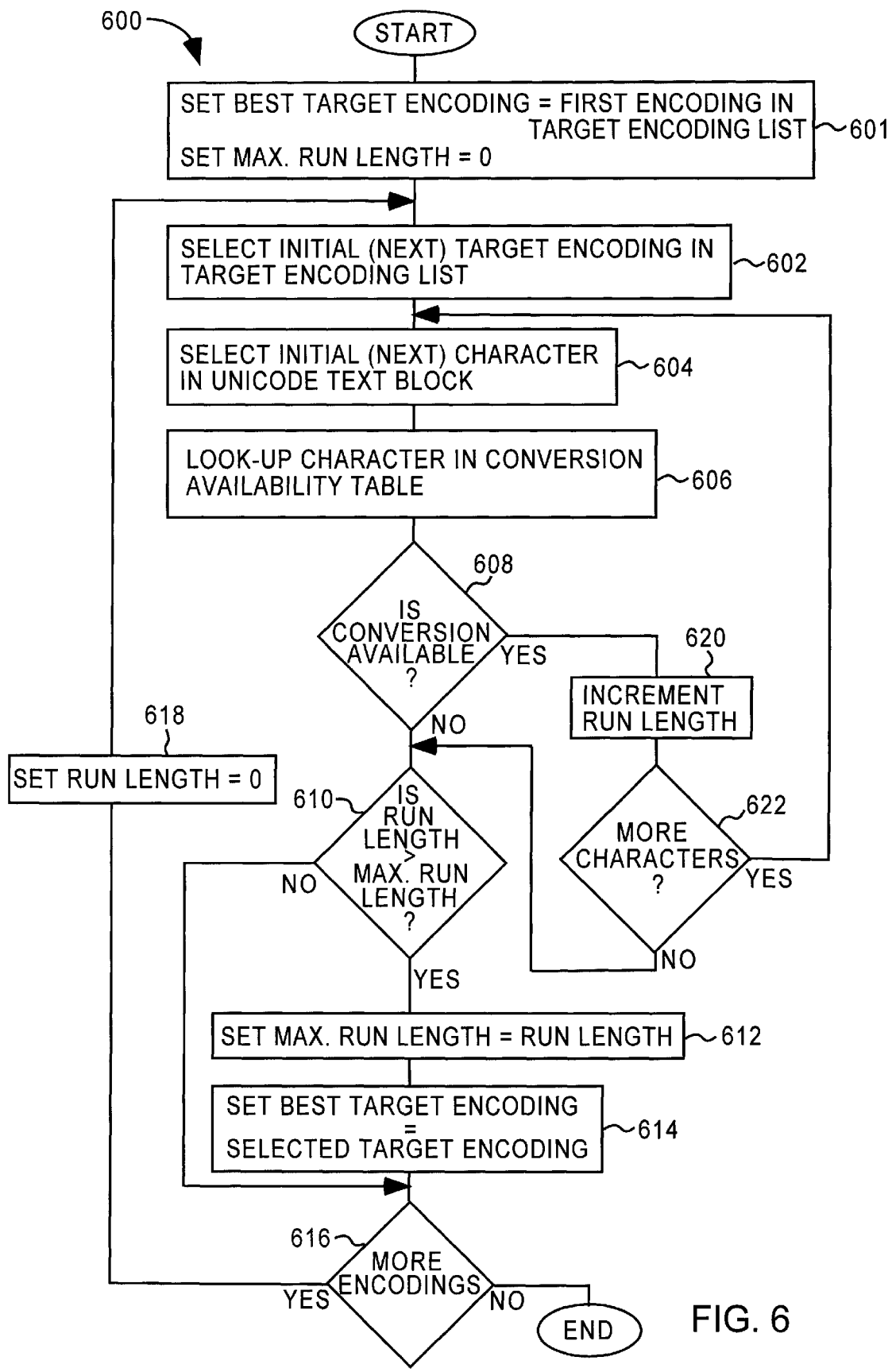
FIG. 6 is a flow diagram of longest target encoding run processing according to an embodiment of the invention.

Although the multi-encoding converter 104 preferably operates to determine which of the available target encodings for a computer system are used in the conversion of the Unicode text into multiple target encodings, according to a third approach, the multi-encoding converter 104 can also operate to select a single target encoding that is well suited for conversion of the Unicode text even though it will likely not be able to convert certain portions thereof. Hence, the third approach is a single-encoding approach. FIG. 6 illustrates a representative single-encoding approach that could be utilized in this regard.

Figure 2:
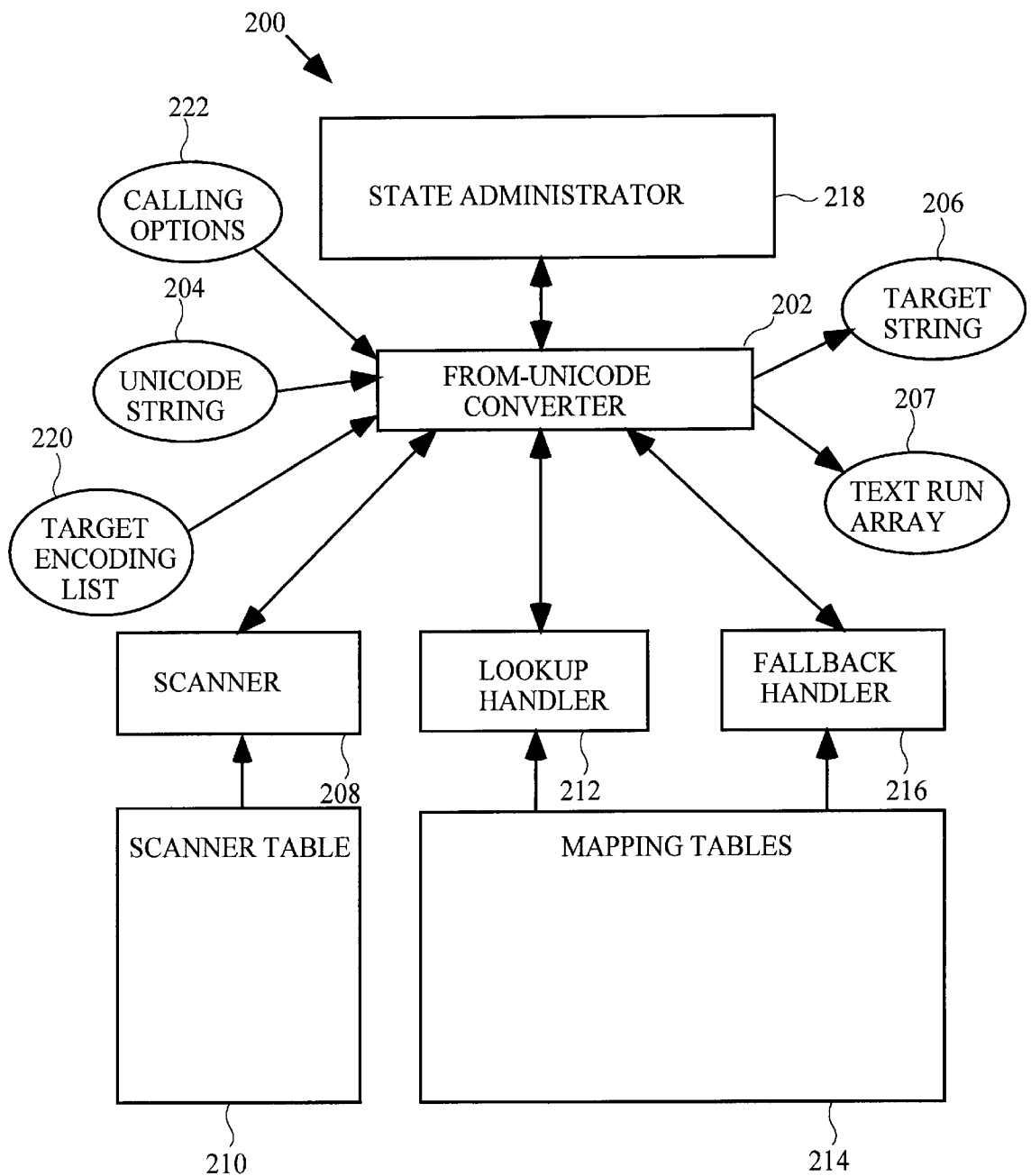
FIG. 2 illustrates a block diagram of an embodiment of a Unicode code conversion system according to the invention.

FIG. 2 illustrates a block diagram of an embodiment of a Unicode code conversion system 200 according to the invention. The Unicode code conversion system 200 is, for example, an implementation of the code conversion system 100 illustrated in FIG. 1. The Unicode code conversion system 200 operates to convert characters of a source string into one or more characters in a target string which are in different character encodings than the encoding utilized in the source string. Preferably, the Unicode code conversion system 200 converts from Unicode to different target encodings.

The Unicode code conversion system 200 includes a From-Unicode converter 202 which receives a Unicode string 204 and produces a target string 206 and a text run array 207. The target string 206 includes multiple different target encodings. The text run array 207 specifies where in the target string 206 the different encodings occur. In other words, the text run array 207 indicates the particular target encoding used in converting the portions of the Unicode string 204.

The From-Unicode converter 202 performs the code conversion process. In so doing, the From-Unicode converter 202 interacts with a scanner 208. The scanner 208 in conjunction with a scanner table 210 scans the Unicode string 204 to identify a text element. The From-Unicode converter 202 then uses a lookup handler 212 to look up the one or more characters in target encoding for the text element identified by the scanner 208. The lookup handler 212 uses mapping tables 214 to obtain the one or more characters in the target encoding for the text element. In one embodiment, different mapping tables are provided for each of the different target encodings available to the Unicode code conversion system. Additionally, the From-Unicode converter 202 may also use a fallback handler 216 when enabled. The fallback handler 216 operates together with the mapping tables 214 to identify one or more characters in the target encoding that are able to be used as a fallback mapping for the text element in cases where the look-up handler 212 has been unable to identify one or more characters in the target encoding for the text element. A state administrator 218 maintains or stores information on the current state of the conversion. This information may, for example, include context, direction and state of symmetric swapping.

Besides the Unicode string 204, the From-Unicode converter 202 also receives from a client (that has called the Unicode code conversion system 200) a target encodings list 220 and perhaps calling options 222. The target encodings list 220 includes a list of available target encodings. The target encoding list 220 is used by the From-Unicode converter 202 to facilitate conversion to multiple target encodings that are determined to be available. Typically, the target encodings contained within the target encodings list 220 are ordered in accordance with predetermined preferences. For example, the predetermined preferences could be listed in the target encodings list 220 with the most preferred target encoding being first in the list. The calling options 222 contain client setting of the various options available by the Unicode code conversion system 200, such as fallbacks, tolerances, etc.

The scanner 208 in conjunction with the scanner table 210 scans the Unicode string 204 and returns the next text element and any additional information needed by the look-up handler 212. The additional information includes one or more of direction information, context information, and various state indicators. The general operation of the scanner 208 is as follows. The scanner 208 scans through the characters of the input Unicode string 204. If direction information is needed for the target encoding, then the character direction is obtained for at least the first character in the text element. Also, if character context information is needed for the target encoding, then character context information is obtained for at least the first character in the text element. Then, as the scanner 208 scans through each of the characters, the scanner 208 takes an action for the character in accordance with information residing in the scanner table 210. The particular action that the scanner 208 takes is determined based on state and character class. The actions that the scanner 208 can take include: marking the current character, setting or clearing the symmetric swapping bit, noting the contextual form of a text element, setting a flag that indicates that the text element will need reordering, and indicating end of the text element. The symmetric swapping bit, the context and the direction are saved by the state administrator 218 as information pertaining to the state of the scanner. Before returning, the scanner 208 saves context information for the text element. The scanner 208 returns the text element (each text element within the input string) and its attributes. The attributes include the following: direction, symmetric swapping state, and context. After the scanner 208 determines a text element, then the characters may need to be reordered into canonical order. As an example, reordering of the characters within a text element is done when the text element includes non-spacing marks that are not in canonical order as defined by Unicode. Preferably, the scanner 208 together with the scanner table 210 are implemented as a pair of state machines that operate in parallel. A first state machine resolves the character direction, and a second state machine computes text elements and character form context information where applicable and also maintains the symmetric swapping state. By using two separate state machines, the Unicode code conversion system 200 is easier to design and maintain. The first and second state machines can be implemented as two-dimensional arrays (or tables) indexed by state and class. In cases where the action the scanner 208 is to take depends on the character direction, then the state machine entry is an index into another table which contains the appropriate action for the scanner 208 to take for each direction.

The function of the scanner 208 is to convert the input Unicode string 204 into text elements and to return the text elements and their attributes. The scanner 208 needs to save certain characteristics of the text element so that it can be properly converted in the target encoding. Namely, the characteristics include the direction, the context and the symmetric swapping state. However, the scanner 208 need not know what the target encoding is because its operation is independent of the particular target encoding. Nevertheless, the Unicode conversion system 200 is preferably implemented such that the definition of a text element (i.e., the chunking behavior) could vary with the target encoding simply by modifying the scanner table 210.

The directionality of characters is used for presentation of the characters. For example, when Arabic or Hebrew are displayed on a display screen, they are ordered from right-to-left. Most Unicode characters have an implicit direction, see Unicode Version 2.0, at p. 3–14 (Section 3.11) and p. 4–10 (Section 4.3). The implicit direction classes provided with the Unicode standard and their values include: Left-Right (0), Right-Left (1), European Number (2), European Number Separator (3), European Number Terminator (4), Arabic Number (5), Common Number Separator (6), Block Separator (7), Segment Separator (8), Whitespace (9), and Other Neutrals (10). The scanner 208 looks up the direction class for characters of the text element. The direction class is then used to resolve the direction of the text element.

There are also special Unicode characters which cause overriding or embedding of directionality. These special direction Unicode characters are treated by the scanner 208 as single character text elements.

There are some basic rules that the scanner 208 follows in forming the text elements. The base rule is that if none of the rules apply, then the text element is a single Unicode character. Another rule is that non-spacing or combining marks following a base character are grouped with the base character as a single text element. Yet another rule is that characters associated with symbols (e.g., Korean Hangul Jamos characters), ligatures or ideographs are encountered, they are combined into text elements. Still another rule is that when a fraction slash is surrounded on each side by a decimal digit, they are combined as a numeric fraction text element.

The mapping tables 214 are used by the lookup handler 212 to match an input sequence of one or more Unicode characters to an output sequence of one or more characters in a particular target encoding. In addition to the Unicode sequence (i.e., text element) itself, certain additional pieces of information about the input sequence are available (e.g., direction, context, symmetric swapping state, vertical forms request, fallback request, tolerance, variant), and some tables make use of this information. Preferably, the mapping table 214 also stores data needed by the fallback handler 216, though a separate table could be provided for use by the fallback handler 216.

Figure 3A:
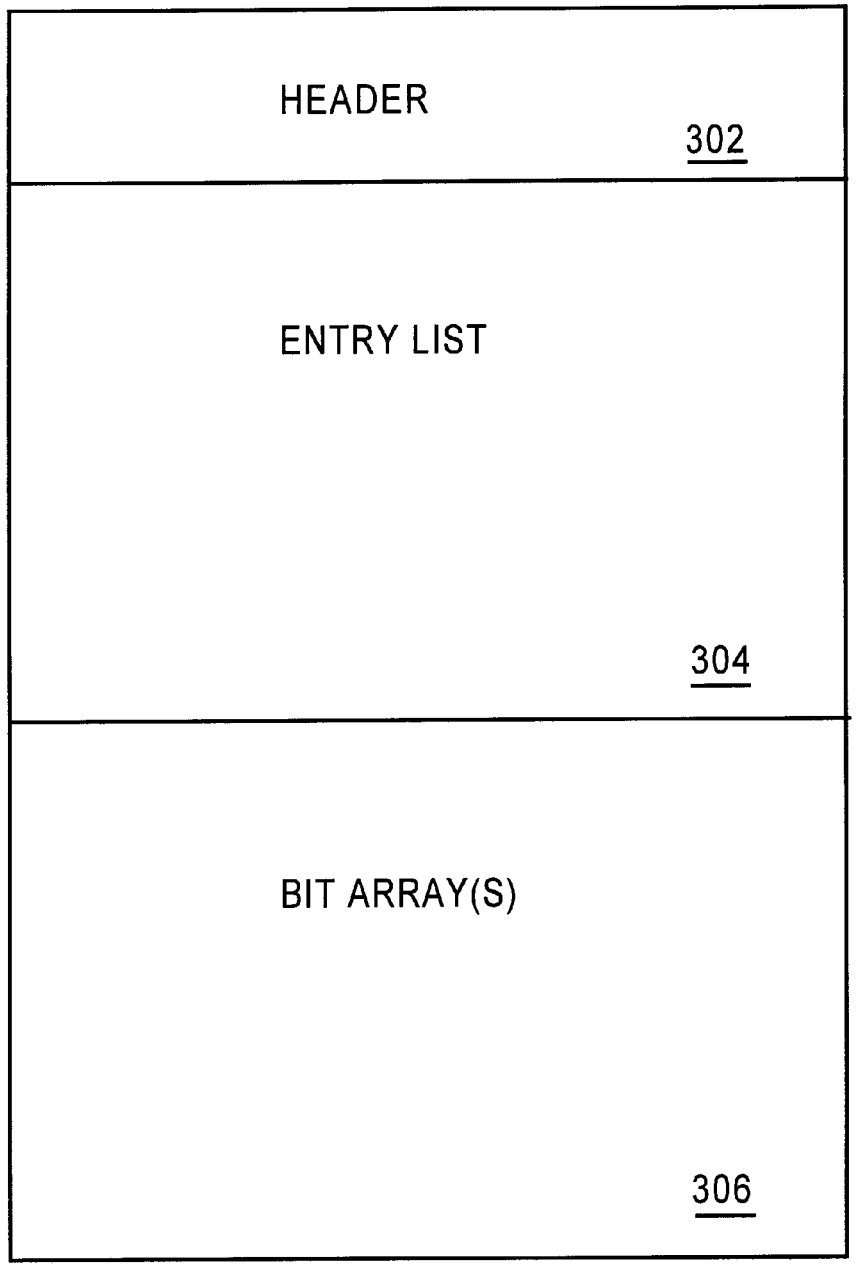
FIG. 3A illustrates a diagram of conversion utility table according to an embodiment of the invention.

To speed the determination of whether a particular Unicode character will convert into a particular target encoding, certain embodiment of the invention can make use of a conversion availability table. FIG. 3A illustrates a diagram of conversion availability table 300 according to an embodiment of the invention. The conversion availability table 300 is specific to a particular target encoding and thus a plurality of different conversion availability tables are provided. The conversion availability table 300 includes a header portion 302, an entry list portion 304, and bit arrays 306. The header portion indicates (i) the number of entries in the entry list portion and (ii) an offset to the start of the bit arrays 306. The entry list portion 304 is indexed by Unicode character codes and provides an indication whether the Unicode character code is able to be converted into the particular target encoding. This indication can be obtained either directly from the entry list portion 304 or indirectly from one of the bit arrays 306 as explained below with reference to FIG. 3B.

Figure 3B:
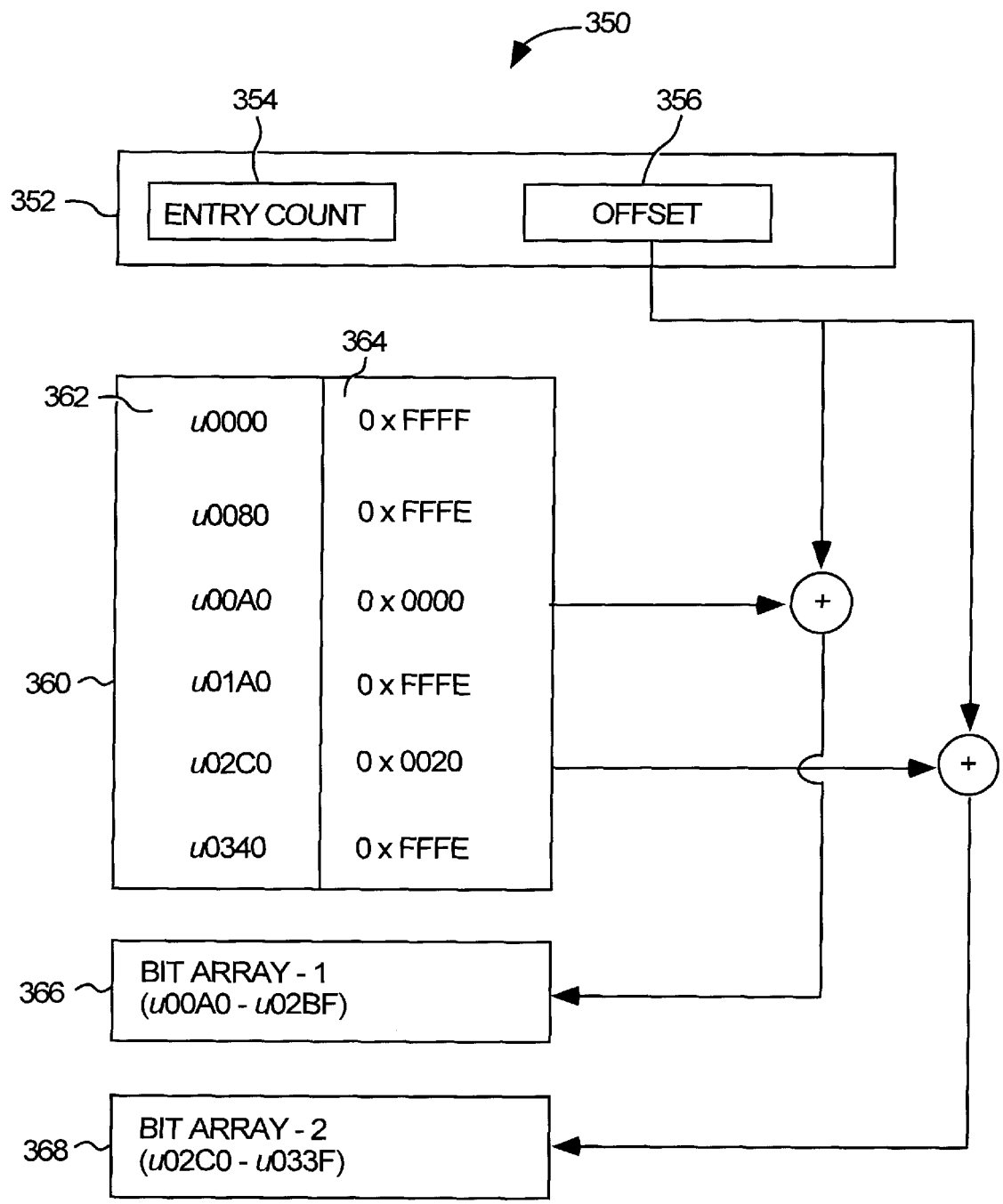
FIG. 3B is a block diagram of a representative conversion availability table for a particular target encoding.

FIG. 3B is a block diagram of a representative conversion availability table 350 for a particular target encoding. The conversion availability table 350 includes a header 352 that includes an entry count 354 and a base offset (OFFSET) 356. The conversion availability table 350 also includes an entry list portion 360 shown containing hexadecimal values. More particularly, a first portion 362 contains Unicode character code values and a second portion 364 contains a value that indicates either that (i) the corresponding Unicode character code values are or are not convertible into the target encoding, or (ii) an offset a bit array section. In this representative embodiment, the bit array section within the conversion availability table 350 includes a first bit array 366 (BIT-ARRAY-1) at offset 0×0000 in the bit array section and a second bit array 368 (BIT ARRAY-2) at offset 0×0020 in the bit array section.

The operation and usage of the conversion availability table 350 is explained by the following examples. In general, the conversion availability table is used to speed the determination of whether a particular Unicode character will convert into a particular target encoding.

In one example, if the Unicode character "u0021" were to be checked for convertibility to the particular target encoding, then the first row of the entry list portion 360 would be the appropriate row since u0021 is with the range of characters between the first and second rows of the entry list portion 360 (namely the range u0000–u007F). Hence, the value "0×FFFF" in the second portion 364 of the first row is used to indicate that the Unicode character u0021 can be converted into the particular target encoding.

In another example, if the Unicode character "u00A0" were to be checked for convertibility to the particular target encoding, then the third row of the entry list portion 360 would be the appropriate row since u00A0 begins the range of characters between the third and fourth rows of the entry list portion 360 (namely the range u00A0–u02BF). Hence, the value "0×0000" in the second portion 364 of the third row is used to provide a partial offset to one of the bit arrays. The partial offset 0×0000 is added to the base offset 356 to obtain a pointer (location or address) to the first bit array 366 that contains a flag for each Unicode character indicating the convertibility of each of the Unicode characters within the range 0×00A0–0×02BF into the particular target encoding.

In still another example, if the Unicode character "u02C5" were to be checked for convertibility to the particular target encoding, then the fifth row of the entry list portion 360 would be the appropriate row since u02C5 is within the range of characters between the fifth and sixth rows of the entry list portion 360 (namely the range u02C0–u033F). Hence, the value "0×0020" in the second portion 364 of the fifth row is used to provide a partial offset to one of the bit arrays. The partial offset 0×0020 is added to the base offset 356 to obtain a pointer (location or address) to the second bit array 368 that contains a flag for each Unicode character indicating the convertibility of each of the Unicode characters within the range u02C0–u033F into the particular target encoding. In yet another example, if the Unicode character "u0395" were to be checked for convertibility to the particular target encoding, then the sixth row of the entry list portion 360 would be the appropriate row since u0395 is with the range of characters following the sixth (and last) row of the entry list portion 360 (namely the range u0340–uFFFF). Hence, the value "0xFFFE" in the second portion 364 of the sixth row is used to indicate that the Unicode character u0395 cannot be converted into the particular target encoding. The values 0×FFFF and 0×FFFE within the second portion 364 of the entry list table 360 can also be considered a convertibility flag for their associated range of character codes.

As noted above with respect to FIG. 2, the From-Unicode converter 202 makes use of the target encoding list 220 in determining what particular target encodings should be considered when converting from Unicode to other character encodings that are more desirable. The target encoding list 220 specifies the target encodings that are supported by a particular computer system (e.g., platform or operating system). While the target encoding list 220 could be manually produced and supplied to the computer system on which the code conversion associated to the invention is to be performed, it is advantageous to automatically generate the target encoding list by automatically interacting with the computer system. The automatic generation of a target encoding list is described below with respect to FIG. 4.

Figure 4:
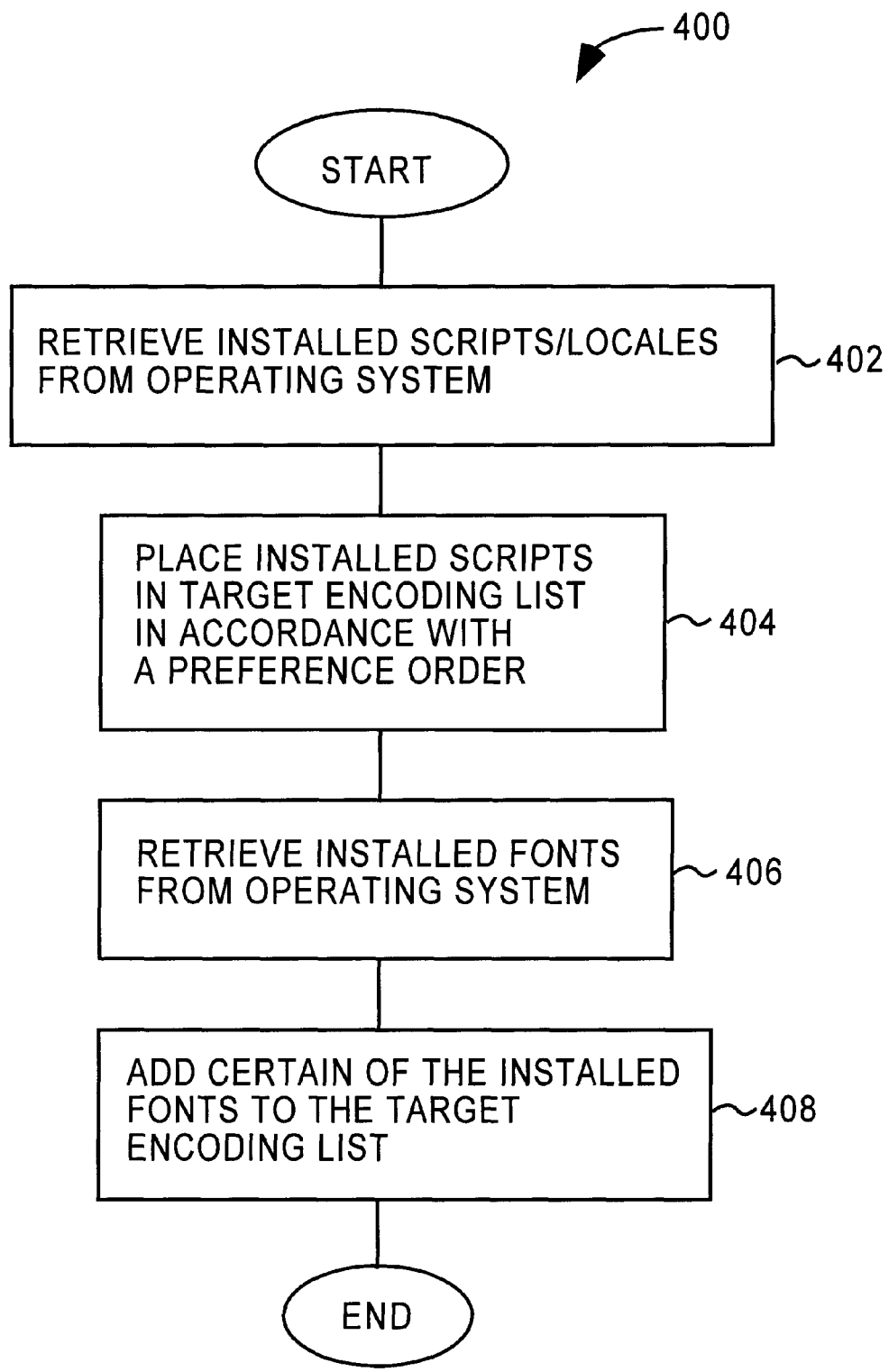
FIG. 4 is a flow diagram of target encoding list creation processing according to an embodiment of the invention.

FIG. 4 is a flow diagram of target encoding list creation processing 400 according to an embodiment of the invention. The target encoding list creation processing 400 initially retrieves 402 installed scripts (locales) from the operating system of the computer system. Normally, the installed scripts (locales) would be identifies by script (locale) codes. A script (system script) or locale is a collection of software facilities that provide for basic differences between writing systems and language preferences. Examples are character sets, fonts, date and number formatting, text collection, etc. A script or locale code is a number indicating a particular script or locale in a particular system. Typically, the scripts (locales) obtained from an operating system are in a preference order. However, if the retrieved scripts (locales) are not in a preference order, then they can be rearranged into a predetermined preference order. Once the installed scripts are retrieved 402, the installed scripts are placed 404 in a target encoding list in accordance the preference order. The target encoding list is initially formed by placing the installed scripts into the target encoding list. The installed scripts are placed in the target encoding list in accordance with the preference order. Next, installed fonts are retrieved 406 from the operating system. Here, the target encoding list creation processing 400 asks and then retrieves the installed fonts that are available from the operating system. Then, certain of the installed fonts are added 408 to the target encoding list. Typically, the certain of the installed fonts that are added 408 are those that are either symbol fonts or fonts that will yield a variant text encoding from one of the installed scripts or symbol fonts. Following block 408, the target encoding list creation processing 400 is complete and ends. At this point, the target encoding list has been created and is available for subsequent use by the multi-encoding converter.

A representative example of the operation of the target encoding list creation processing 400 is provided below. First, assume that in response to a request for the install scripts on the computer system, the operating system returns three (3) scripts in their order of preference. The target encoding list would then include these scripts in their order of preference and be represented by the following table.

| Target Encoding List |
| --- |
| MacRoman |
| MacJapanese |
| MacKorean |

Next, the installed fonts on the computer system are retrieved. Assume here that there are eight (8) installed fonts in the computer system as provided in the following table.

| Installed Fonts |
| --- |
| Geneva |
| Chicago |
| Times |
| Osaka |
| ChuGothic |
| Seoul |
| Dingbats |
| VT100 |

Then, certain of the installed fonts are added to the target encoding list. As a result, the representative target encoding list would be represented by the following table.

| Target Encoding List |
| --- |
| MacRoman |
| MacJapanese |
| MacJapanese + Postscript variant |
| MacKorean |
| Dingbats |
| VT100 |

Note that the target encoding "Macjapanese +Postscript variant" is provided because the installed fonts contained the font "ChuGothic" which is a variant font on Macjapanese. Hence, the "Macjapanese +Postscript variant" was added to the target encoding list just after its non-variant version. Also, the symbol fonts "Dingbats" and "VT100" are known to be symbol fonts and are thus were also added to the target encoding list. In one embodiment, the target encoding list creation processing 400 is able to determine those of the install fonts that are variant fonts or symbol fonts by using a variant table and a symbol table stored within the computer system. For example, for the representative embodiment, the variant table and the symbol table could be as follows.

| Script | Font | Variant |
| --- | --- | --- |
| MacJapanese | ChuGothic | Postscript |
| MacJapanese | TohabaGothic | Basic |
| MacArabic | Baghdad | TrueType |
| MacHebrew | RamatSharon | FigureSpace |

| Symbol Table |
| --- |
| Symbol |
| Dingbats |
| VT100 |

Figure 5:
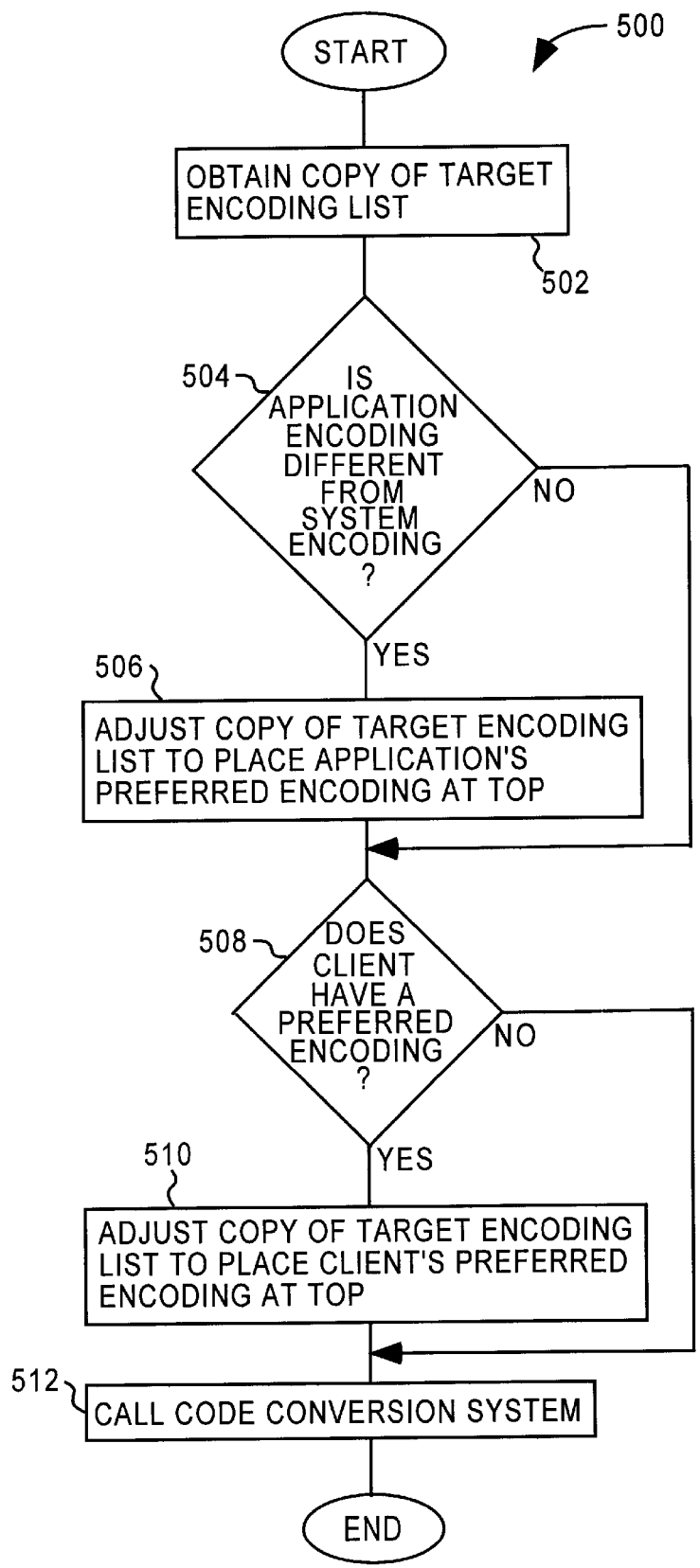
FIG. 5 is a flow diagram of code conversion processing according to an embodiment of the invention.

FIG. 5 is a flow diagram of code conversion processing 500 according to an embodiment of the invention. The code conversion processing 500 is invoked when a request for code conversion from Unicode to other target encodings besides Unicode is made. The code conversion processing 500 initially obtains 502 a copy of the target encoding list. Here, the target encoding list resides in the memory of the computer system and is for general use by various applications on the computer system. Hence, each individual application can obtain its own copy of the target encoding list to perform its code conversion processing.

A decision block 504 then determines whether the application has an encoding preference. When the decision block 504 determines that the application has an encoding preference that differs from the system encoding, then a copy of the target encoding list is adjusted 506 to place the application's preferred encoding at the top of the target encoding list. Alternatively, when the decision block 504 determines that the application does not have an encoding preference different from the system encoding, then block 506 is bypassed.

For example, if the obtained copy of the target encoding list was as follows,

| Target Encoding List |
| --- |
| MacRoman |
| MacJapanese |
| MacJapanese + Postscript variant |
| MacKorean |
| Dingbats |
| VT100 | and knowing that the application preference is for "Macjapanese", then the copy of the target encoding list is adjusted 506 to move "Macjapanese" to the top of the target encoding list. The adjusted target encoding list is then as follows.

| Target Encoding List |
| --- |
| MacJapanese |
| MacRoman |
| MacJapanese + Postscript variant |
| MacKorean |
| Dingbats |
| VT100 |

Following block 506, or following the decision block 504 when the application does not have an encoding preference, a decision block determines whether the client (the caller for the code conversion) has a preferred encoding. When the decision block determines that the client does has a preferred encoding, the copy of target encoding list can be further adjusted 510 to place the client's preferred encoding at the top of the target encoding list. Alternatively, when the decision block 508 determines that the client does not have a preferred encoding, then block 510 is bypassed.

Following block 510, or following the decision block 508 when the application does not have an encoding preference, a code converter is called 512. The code converter is then able to perform the conversion of Unicode text into the target encodings that are supported by the application in accordance with the order of preference. For example, with respect to FIG. 1, the Unicode text and the adjusted copy of the target encoding list would be utilized by the multi-encoding code converter 104 to produce the target string 108 containing multiple different encodings and the resulting text run array 110 indicating where the multiple different encodings are used within the target string 108.

As noted above, the multi-encoding code converter can operate using a number of different approaches. An embodiment of the single-encoding approach is described below with respect to FIG. 6, and embodiments of the first and second (multi-encoding) approaches are described below with respect to FIGS. 7–9.

FIG. 6 is a flow diagram of longest target encoding run processing 600 according to an embodiment of the invention. The longest target run processing 600 can, for example, be performed by the multi-encoding code converter 104 illustrated in FIG. 1 or the From-Unicode converter 202 illustrated in FIG. 2 when using the third approach for conversion of Unicode text into a single target encoding. While the longest target encoding run processing 600 does consider multiple target encodings, only one target encoding is eventually selected and used.

The longest target encoding run processing 600 begins with initialization of some variables. Specifically, a best target encoding is set 601 to the first encoding in the target encoding list, and a maximum run length is set 601 to zero (0). Then, an initial target encoding is selected 602 from a target encoding list. Typically, the initial target encoding in the target encoding list is the most preferred target encoding for the computer system. Next, an initial character is selected 604 in the Unicode text block. Then, the selected character is looked-up 606 in a conversion availability table. The result of the look-up 606 is a flag or value that indicates whether or not conversion to the target encoding is available. The conversion availability table is, for example, the conversion availability table 300 illustrated in FIG. 3A or the conversion availability 350 illustrated in FIG. 3B. The conversion availability table yields a rapid decision on whether conversion to the target encoding is available.

Next, a decision block 608 determines whether conversion is available. When the decision block 608 determines that conversion of the character into the selected target encoding is not available, then a decision block 610 determines whether the run length is greater than a maximum run length. Here, the run length is the number of characters that have been successively determined to be able to be converted into the selected target encoding. When the decision block 610 determines that the run length is greater than the maximum run length, then the maximum run length is set 612 to the run length. Thus, block 612, in effect, updates the maximum run length to the run length of the current target encoding run when it is longer than the previous maximum. Next, a best target encoding is set 614 to the selected target encoding. In other words, the best target encoding is the target encoding that yields the longest target encoding run. Alternatively, when the decision block 610 determines that the length is not greater than the maximum length, then block 612 and 614 are bypassed.

Following the block 614 or following the decision block 610 when the run length does not exceed the maximum run length, a decision block 616 determines whether there are more target encodings to be considered. When the decision block 616 determines that there are no more target encodings to be considered, the longest target encoding run processing 600 is complete and ends.

Alternatively, when the decision block 616 determines that there are more target encodings to be considered, the run length is initially set 618 to zero (0) for the processing of another run length. Following block 618, the longest target encoding run processing 600 returns to repeat the block 602 and subsequent blocks so that the available run length for other target encodings can be processed. Here, when repeating block 602, a next target encoding within the target encoding list is selected 602. Then, the initial character in the Unicode text block would be selected 604 and looked-up 606 in the conversion availability table in the manner previously discussed.

On the other hand, when the decision block 608 determines that conversion of the selected character is available, then the run length is incremented 620. Next, a decision block 622 determines whether there are more characters in the Unicode text block to be processed. When the decision block 622 determines that there are more characters in the Unicode text block to be processed, the longest target encoding run processing 600 returns to repeat the block 604 and subsequent blocks so that subsequent characters in the Unicode text block are able to be selected 604 and subsequently processed. Alternatively, when the decision block 622 determines that there are no more characters in the Unicode text block to be processed, the longest target encoding run processing 600 returns to repeat the block 610 so that other encoding can be considered.

The result of the longest target coding run processing 600 is the identification of a best target encoding for converting of the Unicode text block to one of the available target encodings. According to the longest target coding run processing 600, the best target encoding is the target encoding that is not only supported by the computer system but also achieves the longest run length (i.e., the longest successive number of characters that can be converted to the target encoding). The best target encoding is predicted to be the best choice of the available target encodings, but some portions of the Unicode text block may not convert into the best target encoding.

The first and second approaches noted above are multi-encoding approaches that permit runs in different target encodings when converting out of Unicode. The first and second approaches thus allow the conversion to be carried out such that different portions of the Unicode text block are converted to different target encodings. The first approach allows switching to different target encodings during the code conversion processing but prefers to remain in a particular target encoding. As an example, the first approach is suitable for an English speaker who desires to have an application display as much of the Unicode text block as possible in a Roman based target encoding. The second approach also allows switching to different target encodings during the code conversion processing but prefers to minimize the number of times the target encoding is changed. As an example, the second approach is suitable for a user of an application that desires to be able to efficiently print documents and thus minimizes the switching between target encodings and thus fonts.

Figure 7:
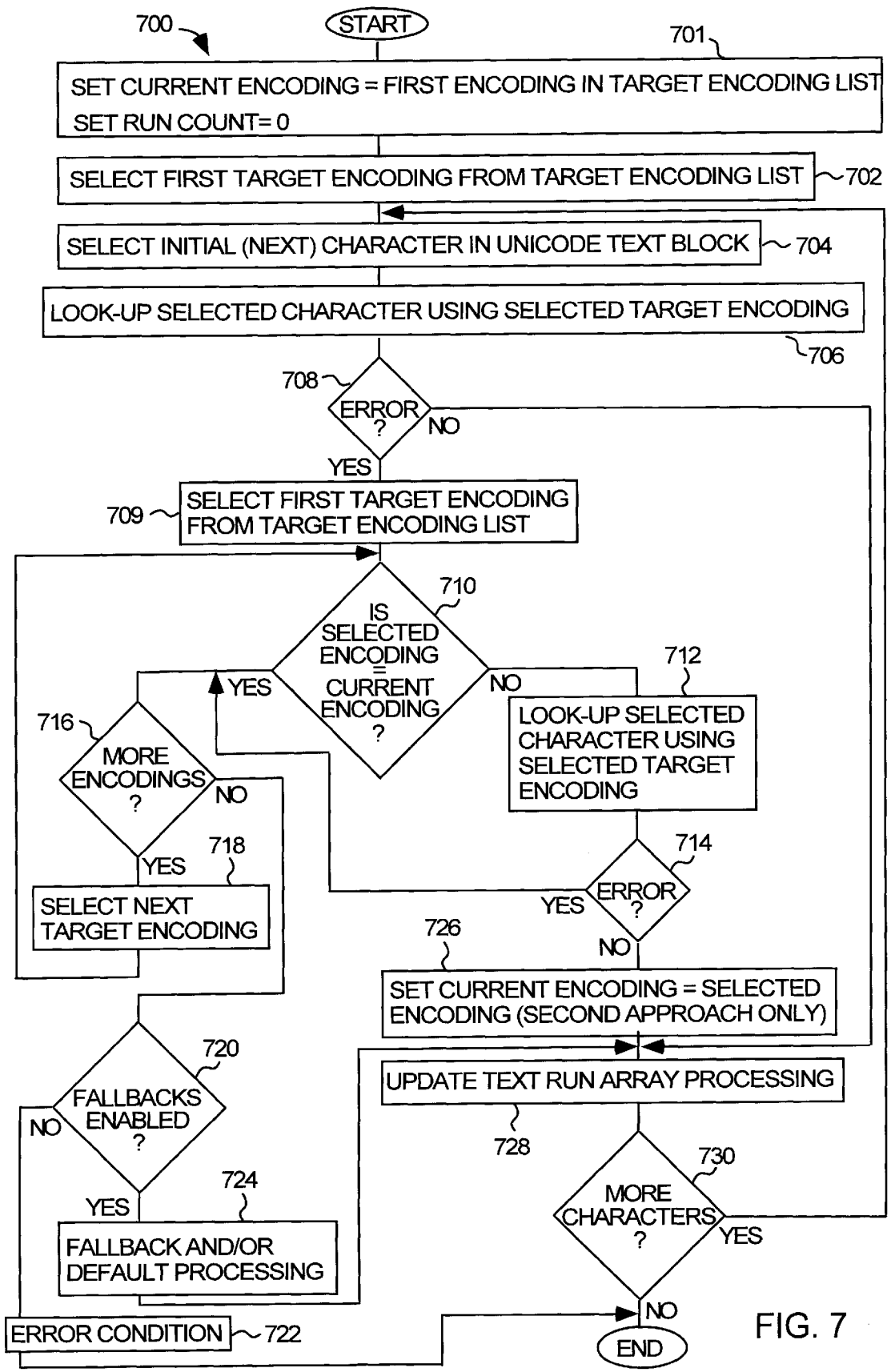
FIG. 7 is a flow diagram of multiple target coding selection processing according to an embodiment of the invention.

FIG. 7 is a flow diagram of multiple target encoding selection processing 700 according to an embodiment of the invention. The multiple target encoding selection processing 700 is, for example, performed by performed by the multi-encoding code converter 104 illustrated in FIG. 1 or the From-Unicode converter 202 illustrated in FIG. 2 when using the first or second approaches for conversion of Unicode text into multiple different target encodings.

The multiple target encoding selection processing 700 initially initializes or sets 701 some variables to initial states. Specifically, a current encoding is set 701 to the first encoding in the target encoding list, and a run count is set 701 to zero (0). Then, a first target encoding is selected 702 from the target encoding list. Typically, the first target encoding is the most preferred target encoding for use on a computer system. Next, an initial character in the Unicode text block is selected 704. Then, the selected character is looked-up 706 to determine whether the selected character is able to be converted into the target encoding. This look-up 706 is referred to as a look-up process. In one embodiment, the selected character is looked-up 706 into a mapping table by a look-up handler, such as the look-up table 212 and the mapping table 214 illustrated in FIG. 2.

Next, decision block 708 determines whether the look-up process returned an error. When the look-up process does return an error, it is understood that the selected character cannot be converted into the selected target encoding. Hence, the multiple target encoding selection processing 700 operates to thereafter determine whether other available target encodings are successful. Here, the first target encoding is selected 709 in the target encoding list. Then, a decision block 710 determines whether the selected target encoding is equal to the current target encoding. More particularly, the decision block 710 determines whether the selected target encoding is the same encoding that was already previously used unsuccessfully in attempting to determine whether the selected character can be converted. This can happen when the look-up process does not always begin at the beginning of the target encoding list but instead biases the look-up process towards one of the target encodings other than the first in the target encoding list. For example, the bias could be towards a particular encoding within the target encoding list, which would cause the processing 700 to always first try that target encoding for subsequent characters being converted, and if that failed, then proceed through the target encoding list from the top. In this example, the particular target encoding in the target encoding list that was already initially tried due to the biasing is effectively skipped. In any case, when the selected target encoding does not match the current target encoding, the selected character is looked-up 712 using the selected target encoding. Following block 712, a decision block 714 determines whether an error occurred during the look-up process. The error indicates that the character is unable to be converted to the selected target encoding.

When the decision block 714 determines that an error has occurred, then processing proceeds to a decision block 716. Also, when the decision block 710 determines that the selected target encoding is equal to the current target encoding, then the decision block 716 is also performed because blocks 712 and 714 are bypassed. The decision block 716 determines whether there are more target encodings to be considered. When the decision block 716 determines that there are more target encodings to be considered, a next target encoding is selected 718 from the target encoding list. Following block 718, the multiple target encoding selection processing 700 returns to repeat the decision block 710 and subsequent blocks.

The processing associated with blocks 710–718 continues until either all of the target encodings have been attempted or one of the target encodings is able to convert the selected character into the selected target encoding. In this regard, when the decision block 716 determines that there are no more target encodings to be considered, a decision block 720 determines whether the fallback option is enabled. For example, the fallback option can be enabled or disabled by the calling options 222. When the decision block determines that the fallback option is disabled, then an error condition is noted 722 and the multiple target encoding selection processing 700 is complete and ends. Alternatively, when the decision block 720 determines that the failback option is enabled, then fallback and/or default processing is performed 724. The fallback and/or default processing 724 is described below with respect to FIG. 9. Following block 714 when the look-up process does not return an error, in the case of the second approach the current encoding is set 726 to the selected encoding to bias the encoding choice for the subsequent characters to the encoding last used. In the case of the first approach, block 726 would be bypassed.

Following the block 724 or 726, as well as directly following the decision block 708, update text run array processing 728 is performed. The update text run array processing 728 is described below with respect to FIG. 8.

Following the block 728, a decision block 730 determines whether there are more characters in the Unicode text block to be processed. When the decision block 730 determines that there are more characters in the Unicode text block to be processed, the multiple target encoding selection processing 700 returns to repeat the block 704 and subsequent blocks. When this repeating occurs, the block 704 operates to select the next character in the Unicode text block. The next target encoding chosen is biased towards a particular preferred target encoding in the first approach, and is biased towards the same encoding as previously used in the second approach. Alternatively, when the decision block 730 eventually determines that there are no more characters in the Unicode text block to be converted, the multiple target encoding selection processing 700 is complete and ends.

When the multiple target encoding selection processing 700 and the obtaining of the code conversions are completed, the target string stores the characters of multiple different encoding and the text run array stores the associations of these characters to the particular multiple target encodings. An example of a representative text run array for a Unicode text block of fifty (50) characters is as follows.

| Text Run Array |
|---|
| MacRoman/0 |
| MacJapanese/10 |
| MacRoman/14 |
| Dingbats/44 |
| MacRoman/45 |

In this example, the first Unicode characters are converted to ten (10) bytes in MacRoman encoding, the next Unicode characters are converted to four (4) bytes in Macjapanese encoding, the next Unicode characters are converted to thirty (30) bytes in MacRoman encoding, the next Unicode character is converted to one (1) byte in Dingbats (symbol), and the remaining Unicode characters are converted to Mac Roman encoding. A character in Unicode is two (2) bytes. This example of the text run array pertains to the first approach which biases the target encoding to MacRoman.

The same example in the case of the second approach might produce the following text run array if the later MacRoman characters are also representable in Macjapanese which is often the case. Here, the second approach attempts minimizes changes in the encoding by remaining in the last used encoding as long as possible.

| Test Run Array |
|---|
| MacRoman/0 |
| MacJapanese/10 |
| Dingbats/44 |
| MacRoman/45 |

Figure 8:
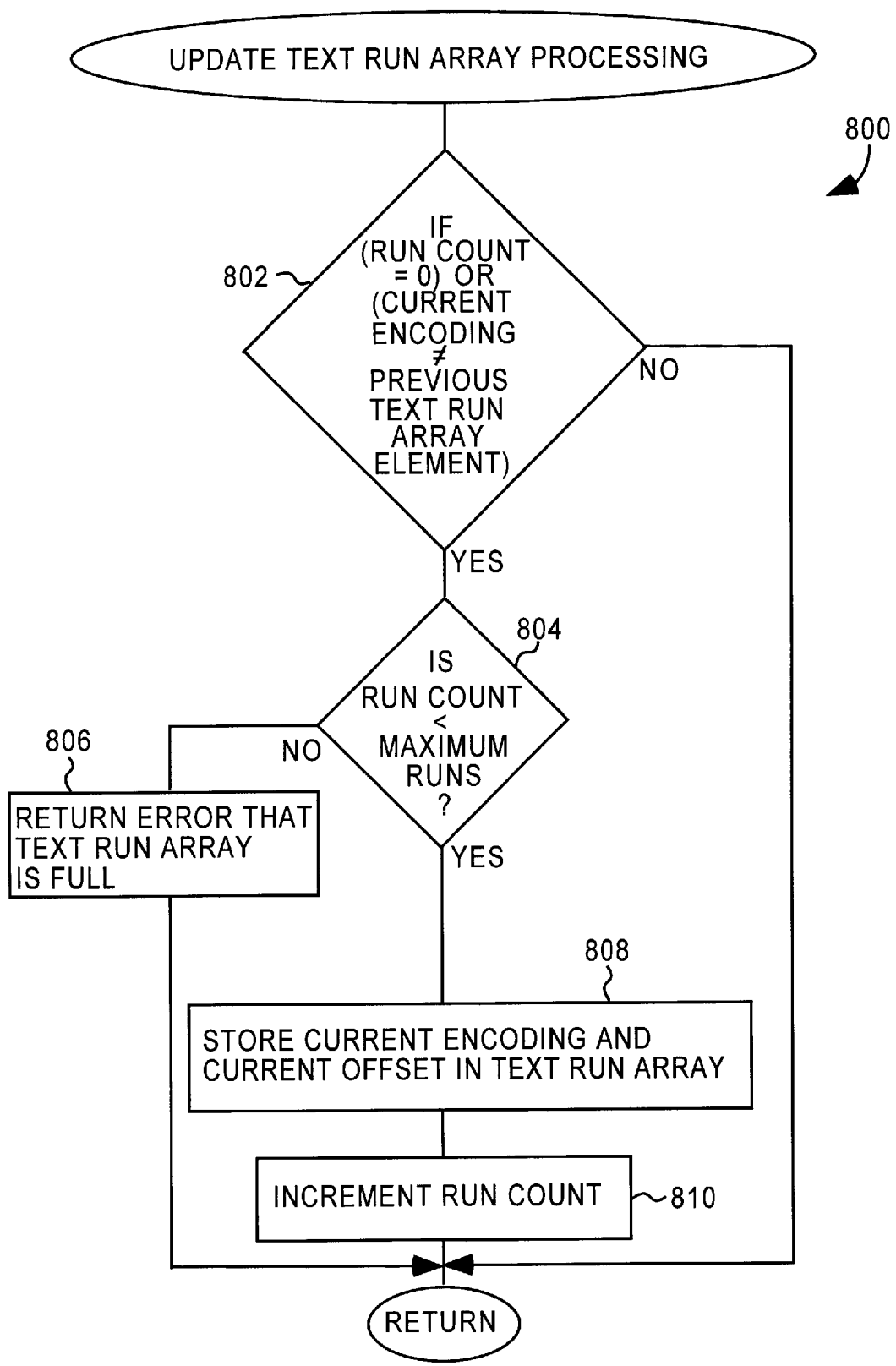
FIG. 8 is a flow diagram of update text run array processing according to an embodiment of the invention.

FIG. 8 is a flow diagram of update text run array processing 800 according to an embodiment of the invention. The update text run array processing 800 operates to produce a text run array that is utilized by the Unicode conversion system to convert the Unicode text block into the target text block having multiple target encodings. In this embodiment, the text run array is updated an entry at a time.

The update text run array processing 800 begins with a decision block 802. The decision block 802 determines whether the run count is at zero (0) or whether the current target encoding is not equal to the previous text run array element. When either the run count is zero (0) or the current target encoding is not equal to the previous text run array element (which signifies or identifies the last target encoding used), then a decision block 804 determines whether the run count is less than a maximum number of runs. The maximum number of runs designates the number of different runs of different target encodings that is permitted by the code conversion system for conversion of the Unicode text block. When the decision block 804 determines that the run count is not less than the maximum number of runs, then an error is returned 806 that specifies that the text run array is full. Following block 806, the update text run array processing 800 returns without having updated the text run array.

On the other hand, when the decision block 804 determines that the run count is less than the maximum number of runs, then the current target encoding and the current offset (i.e., offset into the Unicode text block) are stored 808 in the text run array. The offset is determined by a run length that identifies the number of characters in a run that can be successively converted to the current target encoding. Then, the run count is incremented 810. Following block 810, the update text run array processing 800 returns after having modified the text run array to include information on a run within the Unicode text block.

In another case, when the decision block 802 determines that the run count is not zero (0) or that the current target encoding matches the previous text run array element (i.e., the last target encoding used), then the update text run array processing 800 can return immediately without updating the text run array. In this case, there is no need to add an additional entry because the last entry in the text run array represents a new run and thus the character being currently processed forms part of the same run. In this embodiment, the text run array simple stores the target encoding for a new run and the offset into the Unicode text block for the start of the new run. Hence, between entries in the text run array are ranges of characters that are associated with a run and use the target encoding identified for each new run.

Figure 9:
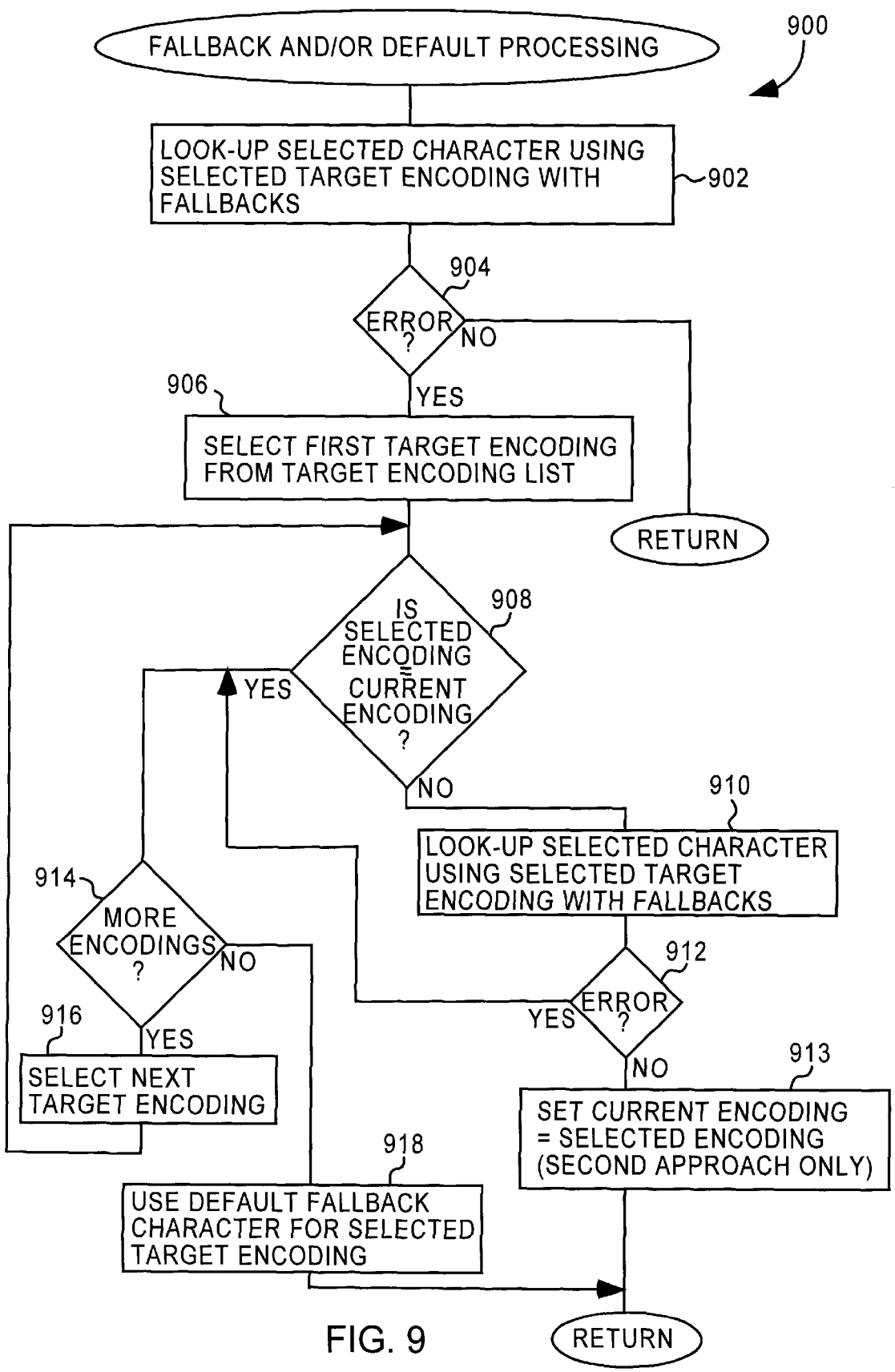
FIG. 9 is a flow diagram of fallback and/or default processing according to an embodiment of the invention.

FIG. 9 is a flow diagram of fallback and/or default processing 900 according to an embodiment of the invention. The fallback and/or default processing 900 is, for example, performed by the fallback and/or default processing 724 illustrated in FIG. 7. Also, the fallback and/or default processing 900 is, for example, performed by the multi-encoding code converter 104 illustrated in FIG. 1 or the From-Unicode converter 202 illustrated in FIG. 2. The client of the code conversion system is able to control (e.g., calling options) whether fallback and/or default processing is performed. The fallback and/or default processing results in a loss of precision in the conversion process, though more conversions are possible. Fallbacks are used by the code conversion system to be able to convert Unicode characters into characters of the target encodings while permitting some degree of flexibility to obtain conversion of more characters.

The fallback and/or default processing 900 initially looks up 902 the selected character using the selected target encoding with fallbacks. Again, the look-up of the selected character is referred to as the look-up process. A decision block 904 then determines whether an error occurred during the look-up process. When the decision block 904 determines that an error did not occur, then the look-up 902 was able to successfully convert the selected character and thus the fallback and/or default processing 900 returns. When the fallback and/or default processing 900 returns, the processing of the multiple target encoding selection processing 700 continues with the block 728 where the text run array is updated.

On the other hand, when the decision block 906 determines that an error did occur during the look-up process, then the fallback and/or default processing 900 needs to continue so that a suitable target encoding can be found for the selected character of the Unicode text block. The first target encoding is selected 709 in the target encoding list so that the search for the suitable target encoding begins at the top of the target encoding list. A decision block 908 then determines whether the selected target encoding matches the current target encoding. When the selected target encoding does not match the current target encoding, the selected character is looked-up 910 using the selected target encoding with fallbacks. Next, a decision block 912 determines whether an error occurred during the look-up process. When the decision block 912 determines that an error has not occurred, in the case of the second approach, the current encoding is set 913 to the selected encoding to bias the encoding choice for the subsequent characters to the encoding last used. In the case of the first approach, block 913 would be bypassed. Following block 913, the fallback and/or default processing 900 is complete and returns because the look-up 910 was able to successfully convert the selected character using fallbacks.

Alternatively, when the decision block 912 determines that an error did occur during the look-up process, then a decision block 914 is performed. The decision block 914 is also performed when the decision block 908 determines that the selected target encoding matches the current target encoding. When the selected target encoding matches the current target encoding (i.e., last used target encoding within the text run array), then the look-up process is known to fail because it has already been unsuccessfully tried. Thus, the decision block 908 improves efficiency of the fallback and/or default processing 900 by skipping the blocks 910 (the look-up process) and the block 912.

In any event, the decision block 914 determines whether there are additional target encodings to be considered. When the decision block 914 determines that there are additional target encodings to be considered, the next target encoding is selected 916 from the target encoding list. Following block 916, the fallback and/or default processing 900 returns to repeat the decision block 908 and subsequent blocks so that the conversion of the selected character into the selected target encoding can be again attempted via the look-up process. On the other hand, when the decision block 914 determines that there are no more target encodings to be considered, a default fallback character is able to be used 918 for the selected target encoding. Following block 918, the fallback and/or default processing 900 is complete and returns.

Although the look-up operations of the blocks 712 and 910 are performed by the look-up handler (and perhaps the fallback handler) which use the mapping table for the associated target encoding, the look-up could also perform a preliminary check as to whether conversion is likely to be possible for a particular character. As an example, the quick check can be achieved by a conversion availability table (for the associated target encoding) such as illustrated in FIGS. 3A and 3B. Then, if the preliminary check were unsuccessful, then the look-up process for the particular character could be bypassed. Such a preliminary check may be able to improve average code conversion times.

The code conversion system can be a computer system or other electronic device for performing these code conversion operations. This computer system may be specially constructed for the required purposes, or it may be a general purpose computer operating in accordance with a computer program. The processing presented herein is applicable to any computer system or other electronic device. In particular, various general purpose computing machines may be used with software written in accordance with the teachings herein, or it may be more convenient to construct a more specialized electronic device to perform the required operations.

Figure 10:
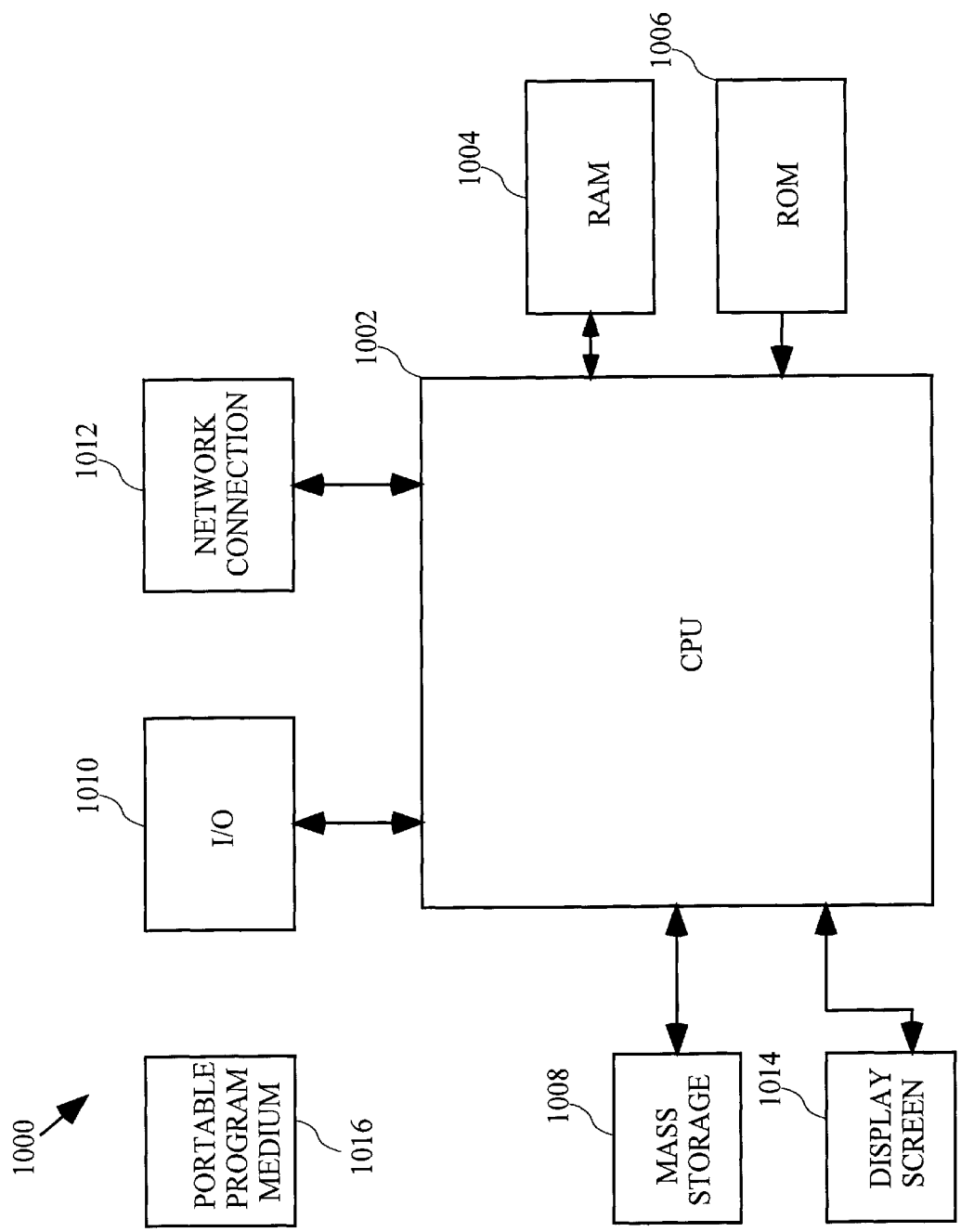
FIG. 10 is block diagram of a representative computer system in accordance with the present invention.

FIG. 10 is block diagram of a representative computer system 1000 in accordance with the present invention. The computer system 1000 includes a central processing unit (CPU) 1002, which CPU is coupled bidirectionally with random access memory (RAM) 1004 and unidirectionally with read only memory (ROM) 1006. Typically RAM 1004 includes programming instructions and data, including tables as described herein, in addition to other data and instructions for processes currently operating on CPU 1002. The ROM 1006 typically includes basic operating instructions, data and objects used by the computer system 1000 to perform its functions. In addition, a mass storage device 1008, such as a hard disk, CD ROM, magneto-optical (floptical) drive, tape drive or the like, is coupled bidirectionally with CPU 1002. Mass storage device 1008 generally includes additional programming instructions, data and text objects that typically are not in active use by the CPU, although the address space may be accessed by the CPU, e.g., for virtual memory or the like. Each of the above described computers further includes an input/output source 1010 that typically includes input media such as a keyboard, pointer devices (e.g., a mouse or stylus) and the like. The computer system 1000 can also include a network connection 1012 over which data and instructions can be transferred. Additional mass storage devices (not shown) may also be connected to CPU 1002 through network connection 1012. The computer system 1000 further includes a display screen 1014 for viewing text and images generated or displayed by the computer system 1000.

The CPU 1002 together with an operating system (not shown) operate to execute computer code. The computer code may reside on the RAM 1004, the ROM 1006, or a mass storage device 1008. The computer code could also reside on a portable program medium 1016 and then be loaded or installed onto the computer system 1000 when needed. Portable program mediums 1016 include, for example, CD-ROMS, PC Card devices, RAM devices, floppy disk, magnetic tape.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, and data transmission media. The computer readable medium can also be distributed over a network coupled computer systems so that the computer readable code is stored and executed in a distributed fashion.

The invention has various advantages depending on the aspects of the invention being implemented. One advantage of the invention is that it converts Unicode text to multiple target encodings so that a high quality code conversion is achieved. Another advantage of the invention is that it is not dependent on having any font or style information that would assist in the code conversion. Still another advantage of the invention is that it is efficient and controllable such that various criteria and tolerances can affect the code conversion. Another advantage of the invention is that the invention can also choose appropriate target encodings for fallback mappings. Yet another advantage of the invention is the ability to identify available target encodings on a computer system in an automated fashion.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A code conversion system for converting a source string to a target string, said system comprising:

a target encoding list containing available target encodings for said code conversion system; and a multi-encoding code converter that receives the source string and converts the source string into the target string, the target string including a plurality of encoding runs of different ones of the available target encodings.

2. A code conversion system as recited in claim 1, wherein the source string has a Unicode encoding.

3. A code conversion system as recited in claim 1, wherein said code conversion system is performed by a computer system, and wherein said target encoding list is automatically produced for the computer system.

4. A code conversion system as recited in claim 1, wherein said multi-encoding code converter comprises:

a converter for controlling the conversion of the source string having a first character encoding into the target string having a second character encoding;

a scanner, operatively connected to said converter, for dividing the source string into text elements, each text element including one or more characters of the source string;

a mapping table for storing target encodings for text elements of the source encoding; and a lookup handler, operatively connected to said converter and said mapping table, for looking up in said mapping table a conversion code associated with a second character encoding for each of the text elements.

5. A code conversion system as recited in claim 4, wherein said multi-encoding code converter further comprises:

a fallback handler, operatively connected to said converter, for providing fallback conversion codes in certain cases, when said lookup handler is unable to provide a conversion code for one or more text elements, the fallback conversion codes contain one or more code points in the target encoding that are not exactly equivalent to the characters in the text element but have a graphical appearance that is similar.

6. A code conversion system as recited in claim 4, wherein said multi-encoding code converter further comprises:

a scanner table, operatively connected to said scanner, for assisting said scanner in determining whether individual characters in the input string should be included within a current text element or alternatively begin a new next text element.

7. A code conversion system as recited in claim 4, wherein the characters in the source string are Unicode characters.

8. A code conversion system as recited in claim 1, wherein the encoding runs of the available target encodings for the target string are variable based on predetermined criteria.

9. A code conversion system as recited in claim 8, wherein the predetermined criteria comprises a user preference.

10. A computer-implemented method for converting a source encoding to target encodings selected from available target encodings, said method comprising:

(a) receiving a source text block, the source text block including a series of text elements;

(b) selecting one of the available target encodings;

(c) selecting one of the text elements from the source text block;

(d) determining whether the selected text element can be converted into the selected target encoding;

(e) selecting a next one of the text elements from the source text block and repeating said determining (d) when said determining (d) determines that the selected text element can be converted into the selected target encoding; and (f) selecting another one of the available target encodings and repeating said determining (d) for the selected text element when said determining (d) determines that the selected text element cannot be converted into the selected target encoding.

11. A computer-implemented method as recited in claim 10, wherein said method further comprises:

(g) updating a text run array so as to identify the target encoding for the selected text element when said determining (d) determines that the selected text element can be converted into the selected target encoding.

12. A computer-implemented method as recited in claim 11, wherein the text run array provides a suitable target encoding for different sequential runs of one or more of the text elements of the source text block.

13. A computer-implemented method as recited in claim 12, wherein the source encoding is Unicode.

14. A computer-implemented method as recited in claim 10, wherein the text elements includes one or more characters.

15. A computer-implemented method as recited in claim 10, wherein the text elements are single characters.

16. A computer-implemented method as recited in claim 10, wherein the available target encodings are provided by a target encoding list.

17. A computer-implemented method as recited in claim 16, wherein said computer-implemented method is performed on a computer system, and wherein said target encoding list is produced by the following actions:

retrieving scripts that are installed on the computer system;

retrieving fonts that are installed on the computer system;

determining a portion of the retrieved fonts to be added to the target encoding list; and producing the target encoding list from the retrieved scripts and the portion of the retrieved fonts.

18. A computer-implemented method as recited in claim 10, wherein the source encoding is Unicode.

19. A computer-implemented method for producing a target encoding list for use by a code conversion system in converting characters in a source encoding to at least one target encoding, the target encoding list and the code conversion system being associated with a computer system, said method comprising:

(a) retrieving scripts that are installed on the computer system;

(b) retrieving fonts that are installed on the computer system;

(c) determining a portion of the retrieved fonts to be added to the target encoding list; and (d) producing the target encoding list from the retrieved scripts and the portion of the retrieved fonts.

20. A computer-implemented method as recited in claim 19, wherein entries in the target encoding list are in an order of preference.

21. A computer-implemented method as recited in claim 19, wherein said retrieving (a) of the scripts that are installed on the computer system and said retrieving (b) of the fonts that are installed on the computer system are obtained from an operating system of the computer system.

22. A computer-implemented method as recited in claim 19, wherein said determining (c) of the portion of the retrieved fonts that are to be added to the target encoding list comprises:

(c1) identifying those of the retrieved fonts that are variants of one of the retrieved scripts;

(c2) identifying those of the retrieved fonts that are symbol fonts; and (c3) determining that the portion of the retrieved fonts to be added to the target encoding list includes those identified by said identifying (c1) and (c2).

23. A computer-implemented method as recited in claim 22, wherein the computer system includes a symbol table, and wherein said identifying (c2) is performed using the symbol table to identify those of the retrieved fonts that are symbol fonts.

24. A computer-implemented method as recited in claim 22, wherein the computer system includes a variant table, and wherein said identifying (c1) is performed using the variant table to identify those of retrieved fonts that are variants of one of the retrieved scripts.

25. A computer-implemented method as recited in claim 24, wherein the computer system includes a symbol table, and wherein said identifying (c2) is performed using the symbol table to identify those of the retrieved fonts that are symbol fonts.

26. A computer readable medium including computer program code for converting a source encoding to target encodings selected from available target encodings, said computer readable medium comprising:

first computer readable medium configured to receive a source text block, the source text block including a series of characters;

second computer readable medium configured to select one of the available target encodings;

third computer readable medium configured to select one of the characters from the source text block;

fourth computer readable medium configured to determine whether the selected character can be converted into the selected target encoding; and fifth computer readable medium configured to select another one of the available target encodings and then to repeat said fourth computer readable medium using the newly selected target encoding when said fourth computer readable medium determines that the selected text element cannot be converted into the selected target encoding.

27. A computer readable medium as recited in claim 26, wherein said computer readable medium further comprises:

sixth computer readable medium configured to select a next one of the characters from the source text block and then to repeat said fourth computer readable medium using the newly selected character when said fourth computer readable medium determines that the selected character can be converted into the selected target encoding.

28. A computer readable medium as recited in claim 27, wherein said computer readable medium further comprises:

seventh computer readable medium configured to update a text run array so as to identify the target encoding used for the selected text element when said sixth computer readable medium determining determines that the selected character can be converted into the selected target encoding.

29. A computer readable medium as recited in claim 26, wherein the source text block is a Unicode text block.

30. A computer readable medium including computer program code for producing a target encoding list for use by a code conversion system in converting characters in a source encoding to at least one target encoding, the target encoding list and the code conversion system being associated with a computer system, said computer readable medium comprising:

computer readable medium configured to retrieve scripts that are installed on the computer system;

computer readable medium configured to retrieve fonts that are installed on the computer system;

computer readable medium configured to determine a portion of the retrieved fonts to be added to the target encoding list; and computer readable medium configured to produce the target encoding list from the retrieved scripts and the portion of the retrieved fonts.

31. A computer readable medium as recited in claim 30, wherein entries in the target encoding list are in an order of preference.

* * * * *